Jan. 1, 1952     L. D. BARTLETT     2,580,878
TWINE DISPENSER

Filed July 22, 1949     2 SHEETS—SHEET 1

Inventor
Lawrence D. Bartlett

By *Clarence A. O'Brien and Harvey B. Jacobson*
Attorneys

Jan. 1, 1952    L. D. BARTLETT    2,580,878
TWINE DISPENSER
Filed July 22, 1949    2 SHEETS—SHEET 2
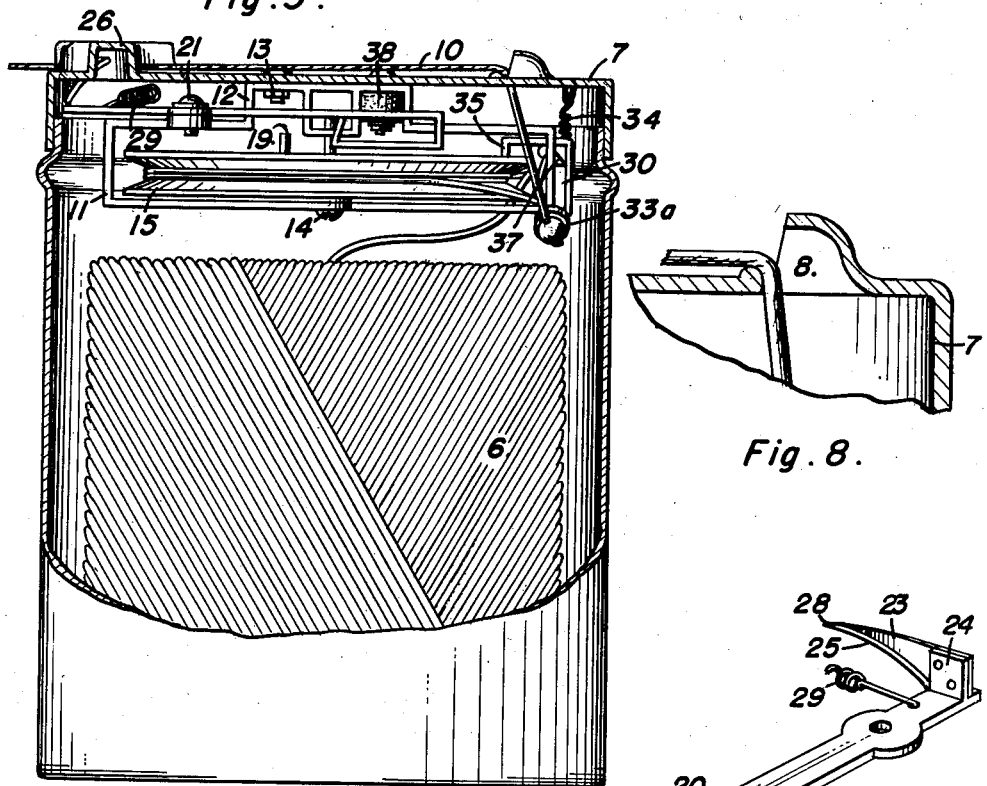
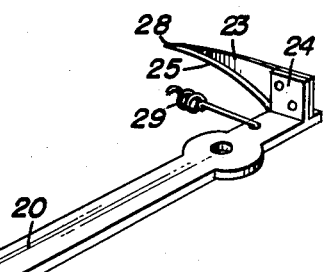
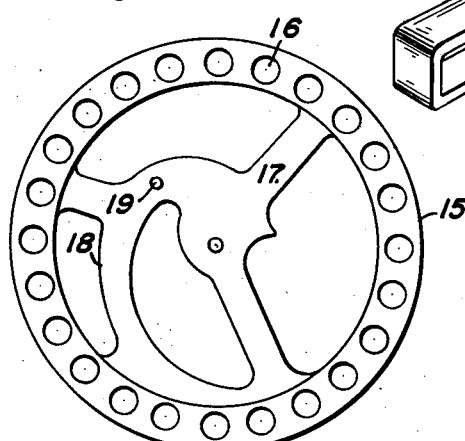
Inventor
Lawrence D. Bartlett Patented Jan. 1, 1952

2,580,878

UNITED STATES PATENT OFFICE 2,580,878

TWINE DISPENSER

Lawrence D. Bartlett, Hartford, Ky.

Application July 22, 1949, Serial No. 106,213

6 Claims. (Cl. 242—142)

The present invention relates to new and useful improvements in cord or twine dispensers and more particularly to means for severing the twine into predetermined measured lengths as the same is dispensed from a container.

An important object of the invention is to provide a twine dispenser including a pivoted cutter operative through the medium of a pulling force exerted on the end of the twine while withdrawing the same from a container to sever the twine after a predetermined length thereof has been removed.

A further object is to provide novel means for keeping the twine under tension during its withdrawing and cutting operations.

Another object of the invention is to provide a swinging cutter operated by a pulley over which the twine passes during its withdrawing movement from the container and providing means for locking the pulley against movement immediately following the severing of the twine to prevent entangling of the twine on the pulley.

A still further object of the invention is to provide an automatic twine severing and measuring mechanism mounted as a unit to the underside of the lid of a container for a ball of twine.

A still further object of the invention is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is a vertical sectional view of the container and lid.

Figure 4 is a bottom plan view of the measuring pulley.

Figure 7 is an enlarged perspective view of the cutter and pivoted cutting arm, and Figure 8 is an enlarged fragmentary sectional view of the outlet opening in the lid for the twine.

Figure 1:
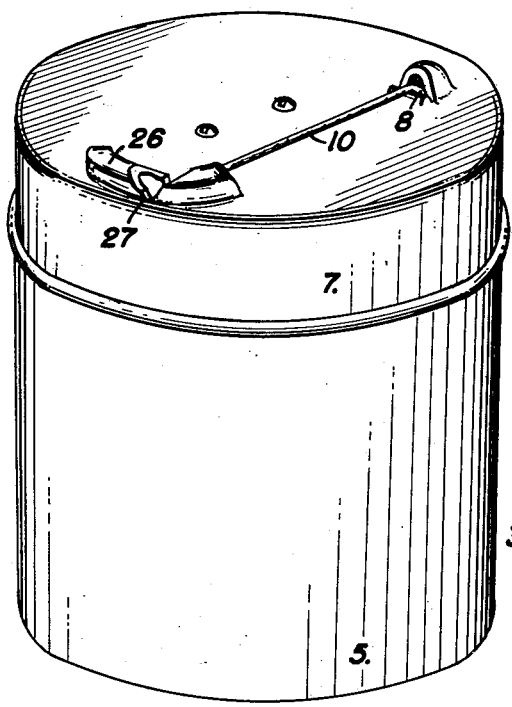
Figure 1 is a perspective view of the twine container showing the lid in position thereon.
Figure 6:
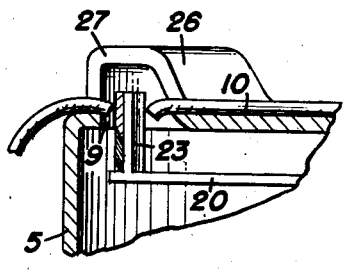
Figure 6 is an enlarged fragmentary sectional view of the guard on top of the lid for the cutter.
Figure 5:
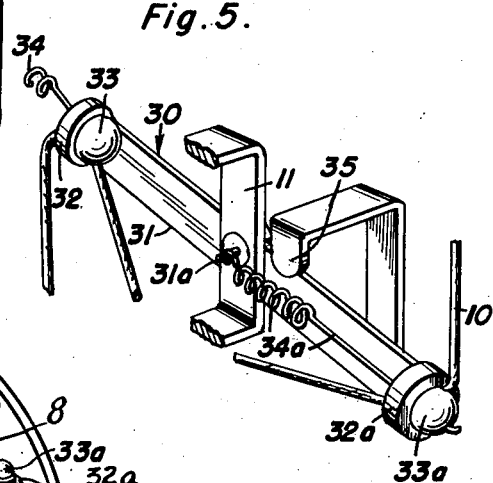
Figure 5 is an enlarged perspective view of the twine tensioning device and lock for the pulley.
Figure 2:
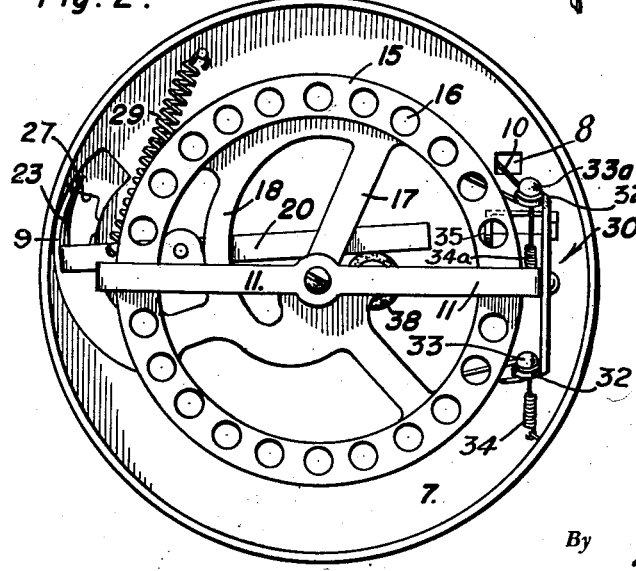
Figure 2 is a bottom plan view of the lid showing the twine severing and measuring mechanism supported at the underside of the lid.

Referring now to the drawings in detail, wherein for the purpose of illustration I have disclosed a preferred embodiment of my invention, the numeral 5 designates a cylindrical container for holding a ball of twine 6 and having a lid 7 telescoping thereon. The lid is formed with openings 8 and 9 at diametrically opposite sides thereof, the free end 10 of the twine being withdrawn through opening 8 and extended across the top of the lid and across the opening 9.

A hanger frame 11 of substantially rectangular shape is formed with an offset 12 at one longitudinal portion of the frame which is secured to the underside of the lid 7 by bolts and nuts or other suitable fasteners 13. A pin or shaft 14 is supported in a vertical position by the upper and lower portions of the frame, at the central portion of the latter, and on which a pulley 15 is rotatably mounted, the pulley being flanged or grooved for receiving one or more coils of the twine and the flanges of the pulley are formed with openings 16.

The pulley 15 is preferably of an open construction and provided with spokes 17 and also formed with an arcuate web 18 and to the upper surface of which is integrally cast or otherwise suitably secured an eccentric pin or cam 19.

A cutter arm 20 is pivoted adjacent one end on a pin 21 secured to the upper portion of hanger frame 11 adjacent one end of the latter, the cutter arm overlying pulley 15 and is formed at its inner end and at its underside with a longitudinally extending bar 22 positioned in the path of movement of pin or cam 19. An arcuate knife blade 23 is suitably secured to an upstanding lug 24 at the outer end of arm 20, the blade 23 being sharpened at its lower edge as shown at 25.

The cutter or knife blade 23 works with an oscillating motion in opening 9 and projects upwardly into a guard 26 formed on top of lid 7 and provided with a transverse notch 27 through which the end 10 of the twine is drawn transversely of the guard and cutter. The cutter blade is of a tapered construction with a pointed outer end 28 to facilitate riding of the cutter over the twine during movement of the cutter in guard 26.

A coiled spring 29 connects cutter arm 20 adjacent blade 23 to the underside of lid 7 and is placed under tension by the swinging of arm 20 through the engagement of bar 22 by cam 19 during rotation of the pulley, the spring 29 pulling the cutter blade 23 across opening 9 to sever the twine 10 when the cutter arm 20 is released from cam 19.

A combined tensioning device and pulley locking device is designated generally at 30 and comprises an arm 31 pivoted at its central portion on a pin 31a at the end of hanger frame 11 adjacent opening 8, the ends of arm 31 being formed with eyes or rings 32 and 32a in which balls 33 and 33a are seated. A coil spring 34 connects ball 33 to the underside of lid 7 to hold ball 33 at the inner side of ring 32 and also to pull the arm 31 upwardly at its end provided with ball 33. A coil spring 34a connects ball 33a to pin 31a to hold ball 33a at the outer side of ring 32a. The twine from the ball of twine 6 passes inwardly through ring 32 and is then wound in one or more coils about pulley 15 and from the pulley the twine passes outwardly through the other ring 32a before passing through the opening 8. Balls 33 and 33a frictionally holds the twine in their respective rings 32 and 32a.

A locking dog 35, preferably of strap metal construction is suitably secured to arm 31 adjacent its end provided with ring 32a and ball 33a and is bent angularly in an inwardly projecting position to enter one of the openings 16 of pulley 15, the dog 35 being held downwardly in engaged position by coil spring 34.

In the operation of the device, the twine from ball 6 is inserted inwardly through eye or ring 32 where it is frictionally held by ball 33 and is then wound one or more times around pulley 15 and from the pulley passes outwardly through eye or ring 32a where it is also frictionally held by ball 33a. From eye or ring 32a the twine passes through opening 8, across the top of lid 7 and across opening 9 in slot 27.

As the twine is pulled, pulley 15 is rotated causing cam pin 19 to engage bar 22 of cutter arm 20 to swing the arm and move blade 23 in its backward stroke until the arm is released from cam pin 19 and spring 29 then pulls blade 23 forwardly to sever the twine, the length of the severed twine being determined by the period during which cam pin 19 travels along bar 22 during rotation of pulley 15.

The initial upward pulling or withdrawing movement of the twine rocks arm 31 to release dog 35 from one of the openings 16 in the pulley to permit rotation thereof and places spring 34 under tension to increase the holding action of ball 33 to prevent slipping of the twine on the pulley, and when the twine is severed by blade 23 the pulling force on arm 31 ceases and spring 34 returns arm 31 to its position for locking engagement of dog 35 to thus instantly stop rotation of pulley 15 and prevent entanglement of the twine.

A stop 37 is provided on the end of hanger frame 11 in the path of movement of arm 31 during releasing movement of dog 35 to hold arm 31 stationary after the dog is released and while the twine is being withdrawn.

A rubber bumper 38 is secured to hanger frame 11 for striking by arm 20 after release thereof by cam 19 to reduce shock to the arm.

All of the cutting and tensioning mechanism as well as pulley 15 are carried by hanger frame 11 for mounting as a unit at the underside of lid 7.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A twine dispenser comprising a container for a ball of twine and having a lid provided with a pair of openings for withdrawing twine through one opening and passing the same across the other of said openings, mechanism within the container for severing the twine in measured lengths operated by the twine during its withdrawing movement and including a cutter working in and extending out of the second named opening to sever the twine above said lid, and a hanger supporting the mechanism at the underside of the lid.

2. A twine dispenser comprising a container for a ball of twine and having a lid provided with a pair of openings for withdrawing twine through one opening and passing the same across the other of said openings, mechanism for severing the twine in measured lengths and operated by the twine during its withdrawing movement, said mechanism including a pulley operated by the twine, an oscillating cutter working in the second named opening, means for oscillating said cutter including a pivoted oscillating cutter carrying bar and an eccentric pin on said pulley wipingly engaging said bar, and means for mounting said mechanism as a unit at the underside of the lid.

3. A twine dispenser comprising a container for a ball of twine and having a lid provided with a pair of openings for withdrawing twine through one opening and passing the same across the other of said openings, mechanism for severing the twine in measured lengths and operated by the twine during its withdrawing movement, said mechanism including a pulley operated by the twine, an oscillating cutter working in the second named opening, an operating connection between the pulley and the cutter, tensioning means for the twine, means locking the pulley against movement upon completion of each severing operation and unlocking said pulley upon withdrawing movement of the twine, and means for mounting said mechanism as a unit at the underside of the lid.

4. A twine dispenser comprising a container for a ball of twine and having a lid provided with a pair of openings for withdrawing twine through one opening and passing the same across the other of said openings, mechanism for severing the twine in measured lengths and operated by the twine during its withdrawing movement, said mechanism including a pulley operated by the twine, an oscillating cutter working in the second named opening, an operating connection between the pulley and the cutter, tensioning means for the twine operated by withdrawing movement of the twine to release the tension on the twine, means normally locking the pulley in a stationary position and releasing the pulley upon a withdrawing movement of the twine, and means for mounting said mechanism as a unit at the underside of the lid.

5. A twine dispenser comprising a container for a ball of twine and having a lid provided with a pair of openings for withdrawing twine through one opening and passing the same across the other of said openings, mechanism for severing the twine in measured lengths and operated by the twine during its withdrawing movement, said mechanism including a pulley operated by the twine, an oscillating cutter working in the second named opening, an operating connection between the pulley and the cutter, tensioning means for the twine, and including a rockable arm, a twine tensioning device at each end of the arm and engaging the twine respectively between the ball and the pulley and between the pulley and the cutter, locking means for the pulley carried by the arm and released by a withdrawing movement of the twine, and means mounting the mechanism at the underside of the lid.

6. A twine dispenser comprising a container for a ball of twine and having a lid provided with a pair of openings for withdrawing twine through one opening and passing the same across the other of said openings, mechanism for severing the twine in measured lengths and operated by the twine during its withdrawing movement, said mechanism including a pulley operated by the twine, an oscillating cutter working in the second named opening, an operating connection between the pulley and the cutter, tensioning means for the twine, and including a rockable arm, a twine tensioning device at each end of the arm and engaging the twine respectively between the ball and the pulley and between the pulley and the cutter, and a locking dog carried by the arm and engaging the pulley to hold the pulley in a stationary position, said dog being released by a withdrawing movement of the twine, and means for mounting all of said mechanism as a unit on the underside of the lid.

LAWRENCE D. BARTLETT.

REFERENCES CITED

The following references are of record in the file of this patent:

UNITED STATES PATENTS

| Number | Name | Date |
| --- | --- | --- |
| 329,200 | Morrison et al. | Oct. 27, 1885 |
| 407,567 | Bauer | July 23, 1889 |
| 548,519 | Coffield | Oct. 22, 1895 |
| 817,050 | La Cour | Apr. 3, 1906 |
| 1,805,619 | Fuller | May 19, 1931 |